July 12, 1966     J. R. MILES     3,260,400

ELECTRICAL OUTLET BOX

Filed Jan. 15, 1964

INVENTOR

Joseph R. Miles

United States Patent Office 3,260,400
Patented July 12, 1966

3,260,400
ELECTRICAL OUTLET BOX
Joseph R. Miles, 4119 W. 177th St., Torrance, Calif.
Filed Jan. 15, 1964, Ser. No. 337,764
4 Claims. (Cl. 220—3.4)

This invention is that of an electrical outlet box having a new and novel feature as herein described, a feature of its construction that has many advantages, as will be seen on reading this specification in connection with an examination of the appended drawing.

Every building that has electricity therein is necessarily provided with any number of electrical boxes in which the outlets and switches are located. The boxes are generally known in the trade as switch boxes when they are used for that purpose.

Electrical outlet boxes, which are usually rectangular or square when viewed from the front, are generally secured to the wall or ceiling structure of a building before the wallboard or ceiling board is put into place. This necessitates the accurate measuring of the location of the opening to be made in the wall or ceiling board as well as the careful cutting or sawing out of the same. This sometimes is rather difficult, particularly if the person doing the work is inexperienced, lacks proper tools, or is pressed for time.

It is, therefore, the principal object of this invention to provide an electrical outlet box that will permit the correct location and instant making of the necessary opening in the wall or ceiling board for the box.

Another object of this invention is to provide an electrical outlet box that will automatically locate its proper opening and configuration on any sheet of wall or ceiling board that is placed up against the same, as well as making it possible for one to make the opening at the same time it is located.

Another object of this invention is to provide an electrical outlet box that permits one to make the necessary opening in any sheet of wall or ceiling board that is to be placed up against the same, without the need of any tools other than an ordinary hammer and a block of wood, which in this instant is a tool.

Another object of this invention is to provide an electrical outlet box that will greatly reduce the time of mounting a sheet of wall or ceiling board over the same.

Another object of this invention is to provide an electrical outlet box that will permit even the most inexperienced person to properly place wall or ceiling board over the same.

Still another, although by no means the last object of this invention, is to provide an electrical outlet of the character herein described that can be manufactured at no greater cost per box than the present day electrical outlet boxes, and yet be a box having all of the many advantages and improvements set forth in this specification and illustrated in the drawing.

These objects are accomplished by the structure and device and relative arrangement of the same, as will fully appear by a perusal of the following specification and claims.

Figure 1:
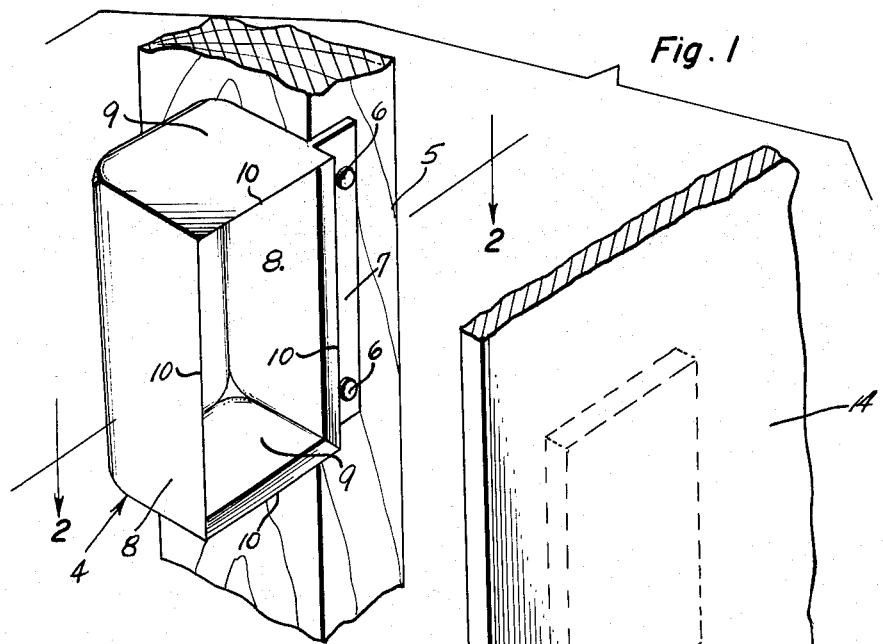
FIGURE 1 is a perspective view of this electrical outlet box mounted on a typical vertical member of a building, with a sheet of wallboard ready to place over the same.

Referring now more particularly to the drawing, the reference character 4 indicates a typical electrical outlet box of the type usually used to house an outlet or switch on the side of a wall of a building, that is secured to a wooden upright 5 by means of two nails 6 or their equivalents passing through the flange 7 of the aforesaid electrical outlet box 4, with which it may be integral as shown in the drawing.

The two sides 8 and the ends 9 of the aforesaid electrical outlet box 4 all have their outer edges sharpened and beveled inwardly at 10, as one can see by looking at either of the two figures of the drawing. This beveled edge of the electrical outlet box is the crux of the invention.

Figure 2:
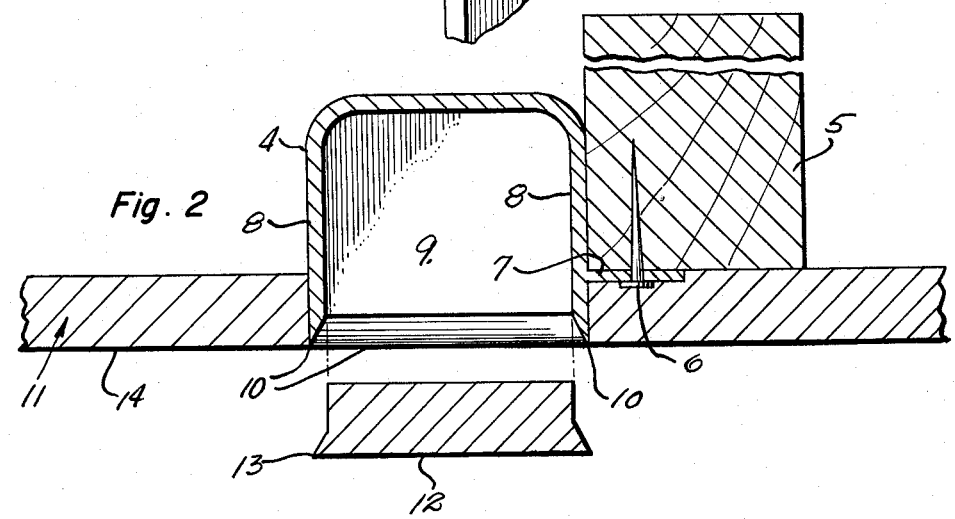
FIGURE 2 is a sectional view of FIGURE 1 taken substantially along line 2—2, but with the wallboard in place showing the opening for the electrical outlet box after the opening has been made by the use of the block, that is also shown in this view.

After the electrical outlet box 4 is mounted in place, as has just been described, it is only necessary to take the sheet of wallboard 11 that is to be secured in place on the wooden uprights, one of which is shown in the drawing and has already been indicated by the reference character 5, and hold the same in place and then take the block of wood 12, that has already been made the exact shape and size of the opening in the aforesaid electrical outlet box 4, and preferably bevel its edges 13, as one can see in FIGURE 2 of the drawing in order that, when this block of wood is held up on the outside 14 of the aforesaid sheet of wallboard 11 directly opposite the electrical outlet box 4 and hit with a hammer, it thereby drives the wallboard into the sharp beveled edge of the electrical outlet box, thus cutting the proper size of opening in the proper place in the sheet of wallboard 11.

While this specification sets forth in detail the present and preferred construction of the device, still in practice such deviations may be resorted to as do not form a departure from the spirit of the invention, as set forth and defined by the appended claims.

Having thus described the invention, the following is claimed as new and useful, and upon which Letters Patent may be desired:

1. An electrical outlet box of the character described, having all edges facing the wallboard of a room in which the said electrical outlet is mounted, formed to cut an opening in the said wallboard when the said wallboard has a block of wood the same size as that of the desired opening in the said wallboard placed upon the room side thereof and hit with a hammer.

2. An electrical outlet box of the character described, having all edges facing the wallboard of a room in which the said electrical outlet is mounted, beveled to cut an opening in the said wallboard when the said wallboard has a block of wood the same size as that of the desired opening in the said wallboard placed upon the room side thereof and hit with a hammer.

3. An electrical outlet box of the character described, having all edges facing the wallboard of a room in which the said electrical outlet is mounted, beveled on the inside thereof to cut an opening in the said wallboard when the said wallboard has a block of wood the same size as that of the desired opening in the said wallboard placed upon the room side thereof and hit with a hammer.

4. An electrical outlet box of the character described, having all edges facing the wallboard of a room in which the said electrical outlet is mounted, beveled on the inside thereof to cut an opening in the said wallboard when the said wallboard has a block of wood the same size as that of the desired opening in the said wallboard placed upon the room side thereof and hit with a hammer, the said block of wood having the same beveled edge as that of the said electrical outlet box.

References Cited by the Examiner
UNITED STATES PATENTS 2,830,662  4/1958  Marcum _____ 30—358

FOREIGN PATENTS 1,063,625  8/1959  Germany.

THERON E. CONDON, *Primary Examiner.*

J. R. GARRETT, *Assistant Examiner.*